United States Patent [19]

Anderson

[11] Patent Number: 4,635,380

[45] Date of Patent: Jan. 13, 1987

[54] METHOD AND APPARATUS FOR HEAT TREATING FLOWABLE MATERIALS

[75] Inventor: George E. Anderson, Champlin, Minn.

[73] Assignee: Crown Iron Works Company, Minneapolis, Minn.

[21] Appl. No.: 614,554

[22] Filed: May 29, 1984

[51] Int. Cl.[4] ............................................. F26B 3/02
[52] U.S. Cl. ........................................ 34/27; 34/40; 34/86; 34/168; 34/173; 426/430
[58] Field of Search .................. 34/27, 35, 40, 79, 86, 34/166, 168, 173, 179, 180, 183; 426/425, 430, 431, 476, 478, 459, 331

[56] References Cited

U.S. PATENT DOCUMENTS

| | | | |
|---|---|---|---|
| 2,254,867 | 9/1941 | Bonotto | 34/27 |
| 2,585,793 | 2/1952 | Kruse | 34/9 |
| 2,690,019 | 9/1954 | Bachmann | 34/166 |
| 2,695,459 | 11/1954 | Hutchins | 34/17 |
| 2,776,894 | 1/1957 | Kruse | 34/37 |
| 3,018,564 | 1/1962 | Kruse et al. | 34/37 |
| 3,367,034 | 2/1968 | Good | 34/10 |
| 3,392,455 | 7/1968 | Kingsbaker et al. | 34/36 |
| 4,223,452 | 9/1980 | Chambers | 34/35 |
| 4,359,480 | 11/1982 | Kock | 426/430 |
| 4,376,073 | 3/1983 | Farmer | 260/123.5 |

FOREIGN PATENT DOCUMENTS 70496  1/1983  European Pat. Off. .

Primary Examiner—Albert J. Makay
Assistant Examiner—David W. Westphal
Attorney, Agent, or Firm—Lawrence M. Nawrocki

[57] ABSTRACT

A continuous process for heat treating flowable materials having liquids thereon and apparatus wherein a first portion of adhering liquid is vaporized in a pre-desolventizer (PDS) consisting of at least one horizontal steam jacketed conveyor tube (60-63), the vaporized vapors of the liquid being directly discharged into a desolventizer (DS) consisting of a vertical chamber being divided into a certain number of compartments (70-73), live steam is introduced into the lowermost compartment (73) to vaporize the remaining portion of liquid adhering on the material and the combined vapors of liquid collected in the upper section of the desolventizer (DS) are discharged into a condenser (91) where a dust-free liquid is recovered. The desolventizer (DS) may also be used as a combined desolventizer-toaster-dryer.

9 Claims, 2 Drawing Figures

METHOD AND APPARATUS FOR HEAT TREATING FLOWABLE MATERIALS

TECHNICAL FIELD

This invention relates to a material treating method and apparatus, and more particularly to a method and a device for heat treating of solvent-extracted meals or flakes, including oilseed meals. The process and device are also applicable to the thermal treatment of other materials and to materials containing solvent or other liquids adhering thereon.

BACKGROUND OF THE INVENTION

By way of example and for the purpose of illustration, the invention will be described herein in connection with solvent-extracted soybean oilseed meal.

In U.S. Pat. No. 2,585,793, there is set forth a process in which solvent-extracted meal containing solvent or other liquid such as water is heated below the boiling-point of water, steam being introduced into the meal to condense on the meal and bring the moisture content of the meal into the range of about 12 to 30% by weight. Thereafter the meal is cooked at a temperature usually above the boiling-point of the water to produce a so-called toasted meal.

In the practice of the known process, the solvent-saturated meal or flakes are withdrawn from the extractor and passed through jacketed agitator equipment serving as a desolventizing means.

The solvent vapors are withdrawn and the meal or flakes substantially free of solvent are passed for further treatment.

In such a process, it was found that, at best, only a small amount of the steam employed could be introduced into lower compartments of the desolventizer, because, when a large volume of steam was employed in the lower compartments, flakes of the meal were carried from the topmost compartment together with the solvent vapors and some steam into the solvent vapor condenser.

It has further been suggested to utilize a so-called pre-desolventizing screw or other device, sometimes called a "SCHNECKEN" or PDS, which is placed between the solvent extractor (SE) and the desolventizer unit (DS) to pre-evaporate a certain percentage of solvent adhering on the meal before conveying the meal into the desolventizer. Such a pre-desolventizer is normally operated by indirect steam either with the aid of steam-heated plates or a steam-jacket forming the walls of the apparatus. The solvent adhering on the meal is partly vaporized and vented from the upper portion of the pre-desolventizer to a condenser via a vapor-washer to prevent meal-flakes entering the condenser.

Though a large portion of the solvent adhering on the meal is rapidly and positively eliminated in the PDS, there is considerable waste of the heat energy employed to vaporize a portion of the solvent in the pre-desolventizing station. Part of this energy leaves the PDS as the heat of vaporization in the solvent vapor discharged. Part of this energy is lost as a result of the superheat of these vapors. The temperature of the solvent vapors is far above the boiling temperature and ranges between about 85 and 100 degrees C. as compared to the nominal boiling range of the solvent (often hexane or its azeotrope, for example) of about 60 to 69 degrees C. at atmospheric pressure.

Furthermore, there is never a dust-free solvent vapor suitable for being recovered. This makes it necessary to install voluminous equipment downflow from the pre-desolventizer, and often downflow from the desolventizer, for washing and filtering the solvent vapors exiting these equipments. As a result, the size and amounts of equipment of the plant are significantly increased, as are the costs for auxiliary energy and maintenance.

SUMMARY OF THE INVENTION

It is a first object of the invention to provide an improved method and device for removing adhering solvents from solvent-extracted solids, which device will effectively filter dust from the solvent vapors evolved in the pre-desolventizer and the desolventizer so as to provide a dust-free recovered solvent.

Another object of the invention is to provide an improved process and device for removing solvent adhering to solvent-extracted solids from a continuous solvent extraction system whereby live steam is employed as the main evaporating agent for the solvent and for moisturizing solids for toasting.

Another object of the invention is to provide an improved process and device for removing solvent adhering to extracted solids from a continuous solvent extraction system followed by drying and toasting the solvent-free solids, wherein a two-step desolventizing is employed. The first or pre-desolventizing stage operates with the aid of indirect steam heating and the second stage or desolventizing step operates with the aid of live steam, thereby recovering solvent vapors which are completely free of solid impurities such as dust or meal-flakes.

Another object of the invention is to provide an improved process and method for desolventizing solids and preparing the solids for toasting in a single, continuous operation without intermediate handling of the solvent vapors vaporized from the solids whereby a very compact and controllable apparatus is used, and wherein the steam consumption is at a minimum, and the solvent being recovered is in a state wherein a high percentage of dust has been removed.

According to the present invention, the solid material leaving the solvent extractor is freed from adhering solvent in a two-stage process, the first stage (i.e. the pre-desolventizer stage) rendering solid material of which the adhering solvent is reduced by from 10 to 80% by weight based on the amount of solvent when leaving the solvent extractor. The remaining portion of solvent is completely removed by vaporization in the desolventizer stage.

The pre-desolventizer operates with the aid of indirect steam heating, e.g. by heat exchange through the steam-jacketed wall or hollow platelike equipment.

A pre-desolventizer suitable for the performance of the invention is known as the "Schnecken" which is a screw conveyor having a double-wall steam heated screw and/or a steam-jacketed wall. Other suitable apparatus for the pre-desolventizing stage are steam-jacketed paddle conveyors, rotary dryers, flat tray cookers, and the like.

Though any suitable desolventizer such as disclosed in the U.S. Pat. Nos. 2,585,793 (Kruse), 2,695,459 (Hutchins), 2,776,894 (Kruse), 3,018,564 (Kruse, et al.), 3,367,034 (Good) or 3,392,455 (Kingsbaker et al.) may be employed in the second stage of the process of the invention (desolventizing stage), the particular apparatus envisioned as being employed is of the kind disclosed in the European Patent Application No. 70496 (Schumacher) published Jan. 26, 1983 (U.S. application Ser. No. 399,995).

It has been found that the consumption of steam per weight-unit of solvent containing solid material to free the solid material from the solvent can be considerably diminished and the purity of solvent vapors vented off the desolventizing stage can be greatly improved if, in accordance with this invention, the hot solvent vapors leaving the pre-desolventizer at a temperature of between about 85 and 100 degrees C. are directly (i.e. without passing a filtering, washing and condensing system) vented through suitable insulated ducts into the desolventizer. The excess heat energy in the superheated solvent vapors is, thereby, transmitted to the partly desolventized solids in the desolventizer.

Preferably, the hot solvent vapors coming from the pre-desolventizer are introduced into a compartment within the desolventizer upwardly disposed within that equipment but below the uppermost compartment thereof. The floors of the compartments above the one into which hot solvent vapors are introduced can be porous so that the vapors will pass therethrough and into contact with the meal in the compartment or compartments above the one into which the vapors are introduced. Vaporization of solvent adhering to the solid material during its passage through the desolventizer will, thereby, be effected by the hot solvent vapors passing therethrough. Additionally, as the hot solvent vapors pass upwardly within the desolventizer through the porous floor or floors of upwardly disposed compartments, particulate matter entrained in the solvent vapors during vaporization in the pre-desolventizer will be filtered by the partly desolventized solid meal in the various compartments through which the solvent vapors pass upwardly.

The combined solvent vapors leaving the top of the desolventizer and being vented to a condenser and distillation unit are highly devoid of particulate matter and require no washing or any other cleaning operation for removal of fines.

DETAILED DESCRIPTION OF THE INVENTION

Figure 1:
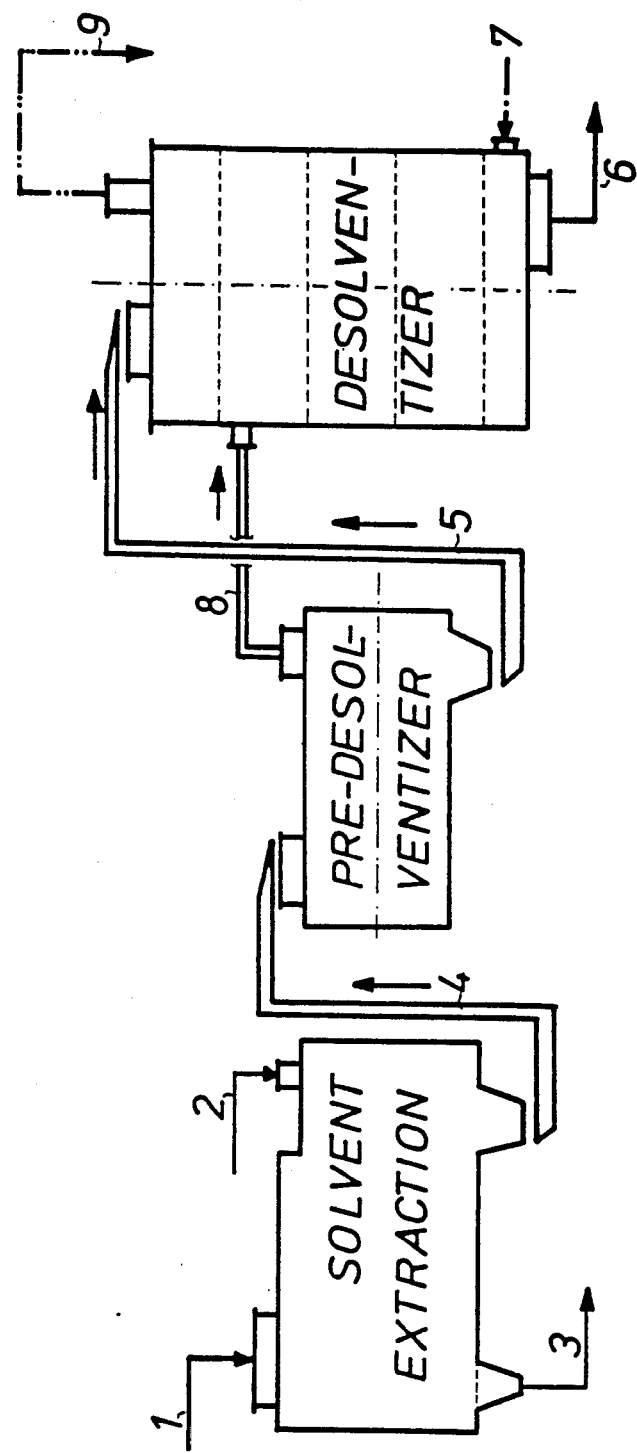
FIG. 1 is a schematic flow diagram of a process in accordance with the present invention for heat treating flowable material in which the hot solvent vapors from the pre-desolventizer are directly introduced into the desolventizer.
Figure 2:
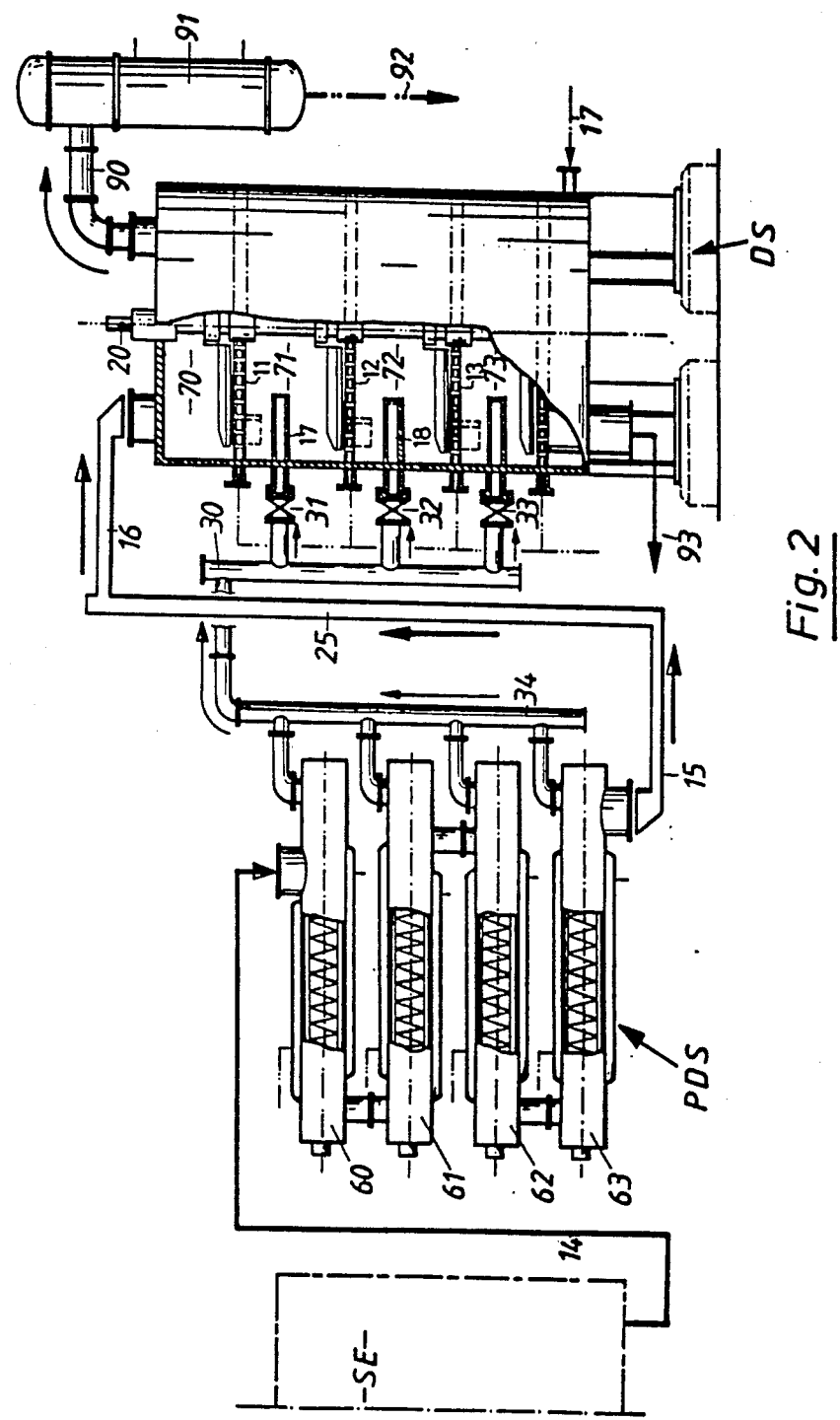
FIG. 2 is a more detailed schematic flow diagram of the same process in which the hot solvent vapors from the pre-desolventizer are introduced underneath the uppermost compartment of the desolventizer. The desolventizer can be a combined desolventizing and drying unit as described in European Patent Application No. 70496.

The process depicted in FIG. 1 and FIG. 2 is one developed for the heat treatment of solvent-extracted soybean oil meal, but the process is also applicable without any essential alterations to other solids having adhered solvent to be vaporized.

Referring to FIG. 1, in the solvent extraction unit, the soybean meal 1, which is preferably in the form of flakes coming from the mill, is subjected to a suitable solvent 2 for the removal of the soybean oil.

Oil laden solvent 3 is withdrawn at the bottom of the solvent extraction system and sent to a recovery still for the separation of the solvent from the oil. The preferred solvent is hexane.

The solvent laden meal, preferably in flaked form, is removed from the extractor with the aid of a conveyor 4, which may be a screw conveyor, an "en masse" conveyor, or any other suitable means, and is discharged into the top of the pre-desolventizer wherein between about 10 and 80% by weight of the solvent adhering on the flakes is vaporized by indirect steam heating.

The solvent vapors having an average temperature in the range of between about 85 degrees C. and 100 degrees C. are vented through conduit 8 directly into the desolventizer where they are introduced below the uppermost compartment.

The desolventizer is also steam heated. Usually only about 5 to 15% by weight of the total steam required, however, is indirect steam being supplied via steam jackets, double bottoms between the various compartments, agitator shaft, etc., while the remaining 85 to 95% by weight of the steam is live steam being introduced via conduit 7 into the lowermost compartment of the desolventizer.

The partly desolventized flakes are removed from the pre-desolventizer by, for example, screw conveyor, "en masse" conveyor or any other suitable conveyor means 5 and discharged into an upwardly disposed compartment of the desolventizer.

In the desolventizer, live steam, in condensing, gives off its latent heat of vaporization and this is imparted to the meal flakes and solvent adhering thereto, so that almost all of the remaining solvent (in an order from about 95% by weight to about 99% by weight) is vaporized very quickly and passes via duct 9 to a condenser where the almost dust-free solvent is condensed outside of the desolventizer.

When passing the upper compartment or compartments of the desolventizer, the solvent vaporized from the partly desolventized flakes in the lower part of the desolventizer combines with the superheated solvent vapors coming from the pre-desolventizer via duct 8.

Any dust in the solvent vaporized in the pre-desolventizer is filtered off in passing through the flakes in the uppermost compartment or compartments of the desolventizer.

Because of heat exchange between the hot solvent vapors from the pre-desolventizer and those from the desolventizer, there is no solvent vapor condensation within the upper portion of the desolventizer.

The desolventized meal is discharged from the bottom compartment of the desolventizer through discharge device 6, which may be a screw conveyor or other feed device regulated to discharge the same quantity of meal as is being fed into the top compartment of the unit. As a result, a relatively constant volume of meal can be maintained in the desolventizer.

The embodiment of the invention illustrated in FIG. 2 is similar to that illustrated in FIG. 1 and demonstrates in greater detail the joint operation of a continuous operating "Schnecken" or screw-type pre-desolventizer and a desolventizer which is similar to the system disclosed in the European Patent Application No. 70496 (Schumacher) published Jan. 26, 1983 (U.S. application Ser. No. 399,995).

The solvent-saturated soybean flakes are continuously withdrawn from the solvent extractor SE through line 14 and passed into the Schnecken-system PDS which, as shown, may consist of one or more horizontally disposed steam jacketed tubes (for example, four) 60, 61, 62, 63 communicating in series and being disposed one above the other. It will be understood that configuration of the tubes in parallel is within the scope of the invention.

The solvent laden flakes are conveyed from tube 60 to tube 61, 62, 63 whereby radiant heat removes from 10% to 80% by weight of the solvent by vaporization. The vaporized solvent leaving the pre-desolventizer has an average temperature of between about 85 and 100 degrees C.

The pre-desolventized flakes are withdrawn from the bottom tube 63 and passed by the aid of a conveyor 15, elevator 25 and a further conveyor 16 into the top compartment of the vertically positioned vapor desolventizer DS.

In the preferred embodiment of the invention the desolventizer DS, which may act as a combined desolventizer-dryer or a desolventizer-toaster-dryer, consists of cylindrical chamber with a centrally inserted rotary shaft 20 which serves to effect horizontal movement of a number of agitators or sweep arms. The latter move over the bottoms of compartments 70, 71, 72 and 73 at a slight distance from the surface of said bottoms to maintain the meal or flakes in adequate mixing motion and keep the flakes as loose as possible.

The flakes pass through suitable bottom discharge means from compartment 70 to compartment 73 (of which not less than two nor more than six compartments are usually provided, depending on the operating conditions and the plant capacity), while, simultaneously, live steam enters through conduit 17 and is distributed through the lower-most bottom to rise upwardly in a direction opposite that in which the meal moves.

As indicated in FIG. 2 the bottoms between the various compartments (with the exception of the lowermost bottom) are provided with holes or perforations uniformly distributed over their entire area in order to ensure a uniform distribution of the live steam. The bottoms 11, 12 and 13 between the compartments 70, 71, 72 and 73 consist of two plates enclosing a steam space which is connected to a supply for steam so that the interior volume of the double-bottoms can be adjusted to the temperature required in the desolventizing process.

It is understood that each individual bottom may have steam admitted thereto separately or may be connected to a common steam source.

The flakes having reached the lowermost compartment 73 are discharged by way of conduit 93 which is preferably a screw conveyor or any other suitable conveyor means. The flakes leaving the plant via conduit 93 are free of solvent and may be conveyed to a drying apparatus if the desolventizer itself does not produce a dry enough material.

Returning to the pre-desolventizer (PDS), the solvent vaporized by radiation heat produced by the action of steam-heated jackets around the tubes 60–63 is vented from each tube to the desolventizer DS with the aid of suitable conduits discharging the superheated solvent vapors into manifolds 34 and 30 from which the superheated solvent vapors are fed into the DS preferably underneath the bottom 11 in compartment 71.

As shown in FIG. 2, the manifold 30 is provided with three outlet conduits extending horizontally into the compartments 71, 72 and 73 of the desolventizer DS. Each conduit is equipped with a suitable valving system 31, 32 and 33 allowing the distribution of superheated solvent vapors to the corresponding compartments 71, 72 and 73.

As has been said before, preferably the entire amount of superheated solvent vapors coming from the pre-desolventizer PDS via manifolds 34 and 30 is supplied through open valve 31 (valves 32 and 33 being closed) into compartment 71 via conduit 17. However, in certain circumstances, it may be appropriate to introduce a minor portion of superheated solvent vapors into other compartments of the desolventizer DS below compartment 71 (for example, into compartment 72 via conduit 18 or even into compartment 73).

This would be appropriate in cases where the amount of dust in the flakes to be treated is extremely high and, therefore, cannot be completely filtered off in the compartment 71 only. Thus, the valves 32 and 33 together with corresponding conduits, act as injectors whenever this is required.

Solvent vapors almost completely free of dust particles are withdrawn from the uppermost compartment 70 of the desólventizer DS through a vent conduit 90 and discharge into the condenser 91 while the flakes, after being desolventized (and dried and toasted if the DS is designed for the combination of desolventizing, drying and toasting) in their passage through the various compartments in a direction opposite that of the live steam supplied via conduit 17, are discharged through conduit 93 for further processing.

The solvent vapors leaving the desolventizer are normally between 60 and 70 degrees C. and have little or no superheat. Superheat energy has largely been used in heating of the solids in chamber 70.

The desuperheated solvent vapors entering the condenser are condensed and withdrawn through conduit 92 for recycling or other utilization.

It will be observed that the process according to the invention requires no solvent cleaning equipment such as scrubbers, filters, or condensers between the pre-desolventizer and the desolventizer.

It will further be observed that the process according to the invention requires no such equipment down flow of the desolventizer DS with the exception of condensing means.

This is the result of employing indirect heating with the aid of steam in the pre-desolventizer where superheated solvent vapor is produced, employing direct heating with the aid of live steam countercurrent to the material to be treated in the desolventizer, and introducing the superheated solvent vapors coming from the pre-desolventizer directly into the desolventizer, preferably just below the upper section of the DS.

The superheated solvent vapors discharged from the pre-desolventizer PDS support the vaporization of solvent in the upper compartments of the desolventizer DS thus decreasing the total steam consumption as compared with a conventional plant by almost 5 to 15%.

It will be understood that the material to be processed as hereinabove specified can include all oil-bearing materials such as vegetable seeds, grains, nuts and like materials, cotton-seed, soya beans, tung nuts, linseed, castor beans, copra, bone meal, meat scraps and the like. The liquid adhering on the material to be treated can comprise inorganic and organic solvents such as water, aqueous solutions, gasoline, hexane, mixed paraffines, aromatic solvents, alcohols, ketones, aldehydes and other polar or nonpolar solvents.

Numerous characteristics and advantages of the invention for which this application has been submitted have been set forth in the foregoing description. It will be understood, however, that this disclosure is, in many respects, only illustrative. Changes may be made in details, particularly in matters of shape, size, arrangement of parts, and percentages of materials and fluids without exceeding the scope of the invention. The invention's scope is, of course, defined in the language in which the appended claims are expressed.

What is claimed is:

1. A process for treating flowable granular solid materials, having a liquid adhering thereon, to remove said liquid, comprising the steps of:
   (a) passing the materials through a pre-desolventizer to heat the materials in order to vaporize and superheat a first portion of the liquid, wherein liquid thereby vaporized and superheated has dust of the granular solid materials entrained therein;
   (b) passing the partly desolventized granular solid materials downwardly through vertically spaced compartments of a desolventizer to completely vaporize the remaining liquid adhering on the materials by means of live steam introduced into the lowermost compartment of the desolventizer, the live steam passing upwardly in a directional flow opposite that of the materials on which the liquid adheres, to vaporize a second portion of the liquid during counter-current passage of said materials and said steam;
   (c) condensing a substantial portion of the steam upon the materials and, currently, introducing superheated vapors of the liquid having dust of the granular solid materials entrained therein from the pre-desolventizer into an upper section of the desolventizer below the uppermost compartment, to pass upwardly through the desolventizer in a directional flow opposite that of the solid granular materials on which the liquid adheres, wherein the super heated vapors of the liquid generated in the pre-desolventizer function to further vaporize in the desolventizer additional of the liquid, and wherein dust entrained in the vapors of the liquid generated in the pre-desolventizer is filtered out of the vapors by the granular solid material passing downwardly through the vertically-spaced compartments of the desolventizer;
   (d) withdrawing the combined vapors of said liquid vaporized in the pre-desolventizer and the desolventizer from the uppermost compartment of the desolventizer and venting them; and
   (e) discharging materials, from which the adhering liquid has been removed, at the lowermost compartment of the desolventizer.

2. The process of treating flowable materials having a liquid adhering thereon according to claim 1 wherein the superheated vapors of said liquid discharged out of the pre-desolventizer have a temperature of between about 70 and 105 degrees C.

3. The process of treating flowable materials having a liquid adhering thereon according to claim 2 in which the material is solvent-laden oilseed meal and the solvent is hexane.

4. The process of treating flowable materials having a liquid adhering thereon according to claim 1, 2, or 3 in which between about 10% by weight and about 80% by weight of the liquid heated in the pre-desolventizer is vaporized by the aid of indirect steam heating in the pre-desolventizer.

5. The process of treating flowable materials having a liquid adhering thereon according to claim 4 wherein about 50% by weight to 100% by weight of the steam supplied into the desolventizer is live steam and between about 0% by weight and 50% by weight is indirect steam.

6. A device for removing a liquid adherent from granular solid materials, comprising:
   (a) first means for heating the materials with the liquid adhering thereto in order to vaporize at least a portion of the liquid and to superheat vapor thereby formed, said vapor having dust of the materials entrained therein;
   (b) means for discharging the materials having residual liquid adhering thereto from said first heating means;
   (c) second means for heating the materials with said residual liquid in order to vaporize substantially all of said residual liquid, said second heating means including a plurality of vertically spaced plenums and at least one porous wall, one of said walls separating two adjacent of said plenums;
   (d) means for introducing the materials into an uppermost of said plenums, the materials passing downwardly through said plenums; and
   (e) means for injecting said superheated vapor into said second heating means through one of said plenums below said uppermost plenum, said superheated vapor passing upwardly through said plenums above that in which it is injected, wherein, as said superheated vapor passes upwardly through said plenums, residual liquid adhering to said materials when said materials enter said second heating means is vaporized and dust entrained in said superheated vapors in said first heating means is filtered therefrom as said superheated vapors pass through said materials.

7. Apparatus in accordance with claim 6 wherein said first heating means includes at least one auger and has a corresponding plurality of horizontal steam jacketed conduits stacked one above the other and being provided with helical ribbon or conveyor flights to transport the granular solids and allow vapor to escape.

8. Apparatus in accordance with claim 6 wherein said second heating means is a combined desolventizer-toaster-dryer system.

9. Apparatus in accordance with claim 6 further comprising manifold means for selectively controlling the injection of said superheated vapor into said second heating means through one or more of said plenums below said uppermost plenum.

* * * * *